United States Patent
Hoff et al.

(10) Patent No.: US 7,822,532 B2
(45) Date of Patent: Oct. 26, 2010

(54) POWER-BASED UNDERSPEED CONTROL

(75) Inventors: Brian D. Hoff, East Peoria, IL (US); Frank A. DeMarco, East Peoria, IL (US); Thomas M. Sopko, East Peoria, IL (US); Michael Barngrover, Peoria, IL (US); Brian D. Kuras, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 320 days.

(21) Appl. No.: 12/028,485

(22) Filed: Feb. 8, 2008

(65) Prior Publication Data

US 2009/0199814 A1 Aug. 13, 2009

(51) Int. Cl.
G06F 19/00 (2006.01)
F02D 41/02 (2006.01)
B60W 10/06 (2006.01)

(52) U.S. Cl. .................. 701/110; 701/54; 123/350; 477/107

(58) Field of Classification Search .................. 123/350, 123/352, 357, 358, 361, 399; 701/54, 101–105, 701/110, 111, 115; 477/107, 110, 111
See application file for complete search history.

(56) References Cited

U.S. PATENT DOCUMENTS

| | | | |
|---|---|---|---|
| 2,958,999 A * | 11/1960 | Van De Hey | 123/363 |
| 4,520,272 A * | 5/1985 | Danno et al. | 123/339.18 |
| 5,468,126 A | 11/1995 | Lukich | |
| 5,525,043 A | 6/1996 | Lukich | |
| 5,682,315 A | 10/1997 | Coutant et al. | |
| 5,842,144 A | 11/1998 | Coutant et al. | |
| 5,996,343 A | 12/1999 | Kuras | |
| 6,183,210 B1 * | 2/2001 | Nakamura | 417/222.1 |
| 6,295,497 B1 | 9/2001 | Kuras | |
| 6,343,250 B1 | 1/2002 | Kuras et al. | |
| 6,385,970 B1 | 5/2002 | Kuras et al. | |
| 6,424,902 B1 | 7/2002 | Kuras | |
| 6,901,324 B2 | 5/2005 | Rose et al. | |
| 6,959,241 B2 * | 10/2005 | Itow et al. | 701/102 |
| 7,146,263 B2 | 12/2006 | Guven et al. | |
| 7,192,374 B2 | 3/2007 | Kuras et al. | |
| 7,247,122 B2 | 7/2007 | Shah | |
| 7,631,495 B2 * | 12/2009 | Naruse | 60/426 |
| 7,644,697 B2 * | 1/2010 | Samo et al. | 123/373 |
| 2009/0156360 A1 * | 6/2009 | Barngrover et al. | 701/54 |

FOREIGN PATENT DOCUMENTS

| | | |
|---|---|---|
| JP | 2000-198375 | 7/2000 |
| JP | 2006-333766 | 12/2006 |
| WO | 2006-133987 | 4/2006 |

* cited by examiner

*Primary Examiner*—Willis R Wolfe, Jr.
(74) *Attorney, Agent, or Firm*—Leydig, Voit & Mayer

(57) ABSTRACT

A method of adjusting the operation of an engine-driven machine to avoid engine under-speeding entails converting a received speed or torque command into a power command. When an engine under-speed condition is sensed, the system performs underspeed correction in the power domain before converting the underspeed processed power command back into the units of the original domain. The converted underspeed processed power command is issued to the transmission or other component to alleviate the engine under-speeding condition.

20 Claims, 8 Drawing Sheets

POWER-BASED UNDERSPEED CONTROL

TECHNICAL FIELD

This disclosure relates generally to systems and methods for controlling CVT transmissions and, more particularly, to anti-lugging systems and methods for machines having CVT transmissions.

BACKGROUND

Most engines comprise a number of rotating parts, and thus have an ideal speed range in which their power output is optimum. This ideal range may correspond, for example, to a range exhibiting peak torque output as a function of RPM. A broader permissible speed range encompasses this ideal range and includes greater and lesser speeds at which the engine may operate, even if in a suboptimum manner. Finally, outside of this permissible speed range lie speeds at which the engine cannot provide sustained operation. For example, speeds that are higher than the highest speed in the permissible range may cause greatly accelerated or catastrophic failure of the engine, transmission, or implement system.

At speeds lower than the bottom limit of the larger range, the engine may cease rotation. In particular, most engines operate via an inertia-driven cycle, wherein preceding combustion events power the engine toward subsequent combustion events via the engine's rotational inertia. When the engine speed decreases below a certain lower limit, the engine's rotational inertia is insufficient for the engine to reach subsequent combustion events. An example of a lowest reliable operating speed based on this principle is the engine "idle" speed. Typically, lower engine speeds are possible, but the idle speed is set to a value that allows for a slight decrease in engine speed without causing the engine to drop out of the sustained combustion range.

In a typical machine arrangement, the engine inertia must be sufficient to overcome not only the internal resistance leading up to a subsequent combustion event, but also any outside resistance imposed by the power train. For example, the inertial, frictional, or other resistance involved in moving the machine must be overcome when the machine is in gear. Thus, while the idle speed is a realistic lower limit when the machine is stationary, a machine in operation may have a heightened lower limit, below which the engine lacks sufficient power to accelerate or even continue a present operation. When the engine speed drops past this lower limit, the engine is said to "lug" down or "bog" down, and continued reliable operation is jeopardized.

In a conventional-drive machine, the engine is generally linked to the power train and other power sinks of the machine via a torque converter. In these systems, a higher resistance (required torque) is automatically mitigated by the natural loading characteristics of a torque converter, thus preventing the engine from lugging down and stalling. However, in a CVT-driven machine ("CVT" denotes a continuously variable transmission), there is generally no torque converter, and the machine resistance will be able to lug down and stall the engine absent an external control mechanism. Typically, the engine is monitored for lug/stall problems and the transmission is actively controlled, e.g., via a software Engine Underspeed Algorithm (EUA) in an Electronic Control Module (ECM) to avoid lug/stall and to force the engine to operate at the desired optimal speed condition. In other words, the EUA acts to prevent stalling and then may also act to return the engine to its peak power point.

A typical EUA reduces the drivetrain transmission speed demand, in reaction to a difference between the actual engine speed and the desired engine speed (e.g., "speed standard"), detected from a user interface or from an engine control component as a response to changed conditions.

Although the resolution of deficiencies, noted or otherwise, of the prior art has been found by the inventors to be desirable, such resolution is not a critical or essential limitation of the disclosed principles. Moreover, this background section is presented as a convenience to the reader who may not be of skill in this art. However, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, a method of adjusting the operation of an engine-driven machine to avoid engine under-speeding is provided. The method comprises receiving an initial command specifying a value related to a desired torque and converting the received command into a power command. When an engine under-speed condition is sensed, the system reduces the power command to an underspeed processed power command and converts the underspeed processed power command to units that are the same as the units of the initial command. Finally, the converted underspeed processed power command is issued to a portion of the machine to alleviate the engine under-speeding condition.

In another aspect, a controller is provided for adjusting the operation of an engine-driven machine to avoid engine under-speeding. In this aspect, the controller comprises computer-readable instructions on a computer readable medium including instructions for receiving an initial command specifying a value related to a desired torque and instructions for converting the received command into a power command. Pursuant to further instructions, when an engine under-speed condition is sensed, the controller reduces the power command to an underspeed processed power command, converts the underspeed processed power command to units that are the same as the units of the initial command, and issues the converted underspeed processed power command to a portion of the machine to alleviate the engine under-speeding condition.

In yet a further aspect, a engine-driven machine is provided with a power-domain underspeed function. The machine has an engine and a transmission linked to the engine. A controller receives data from the engine and sends commands to the transmission. The controller is adapted to detect an engine underspeed condition and to convert a received command in a first domain into a power command and to perform underspeed processing on the power command to produce a reduced power command. The reduced power command is converted into a final command in the first domain.

DETAILED DESCRIPTION

A typical EUA system operates by sensing that a difference between the requested and actual engine speeds exceeds a predetermined threshold. When a qualifying difference is detected, the EUA reduces the transmission, implement, and/or parasitic power requirements. An operator may desire a rapid increase in machine or engine speed or power and thus request a step change in the relevant parameter. The onboard EUA functions both to save the engine from stalling by lugging down (underspeeding), e.g., by reducing the load on the engine.

Although an EAU without the disclosed improvement may cause certain performance deficiencies at low throttle and low load operations, and it is possible to eliminate the anti-lugging feature of the EUA, this would result in undesirable engine lugging under certain conditions. Instead, in an embodiment, machine performance is optimized through a technique of desired power shaping as will be described. The technique of desired power shaping limits the power that may be demanded from the machine to avoid lugging, e.g., an underspeed condition.

As will be discussed hereinafter, the disclosed principles can be implemented with a traditional PID (proportional-integral-derivative) controller, which is a control loop feedback mechanism that minimizes an error between a process variable and a setpoint for the variable. Generally, the PID controller in the disclosed embodiments operates by deriving appropriate corrective actions and adjusting the machine operation accordingly.

Although other suitable feedback corrective mechanisms may be used, the PID controller employs proportional, integral and derivative parameters. The proportional parameter determines the reaction of the system to current inaccuracies, the integral parameter determines the reaction of the system to recent errors and the derivative parameter determines the reaction of the system to the rate of error change. A function of these parameters is used to minimize the distance between the variable being tracked and the setpoint for that variable. In an embodiment, a PI controller, which omits the derivative parameter, may alternatively be used to avoid erratic performance or corrective overshoot, since derivative functions can be sensitive to measurement noise.

Figure 1:
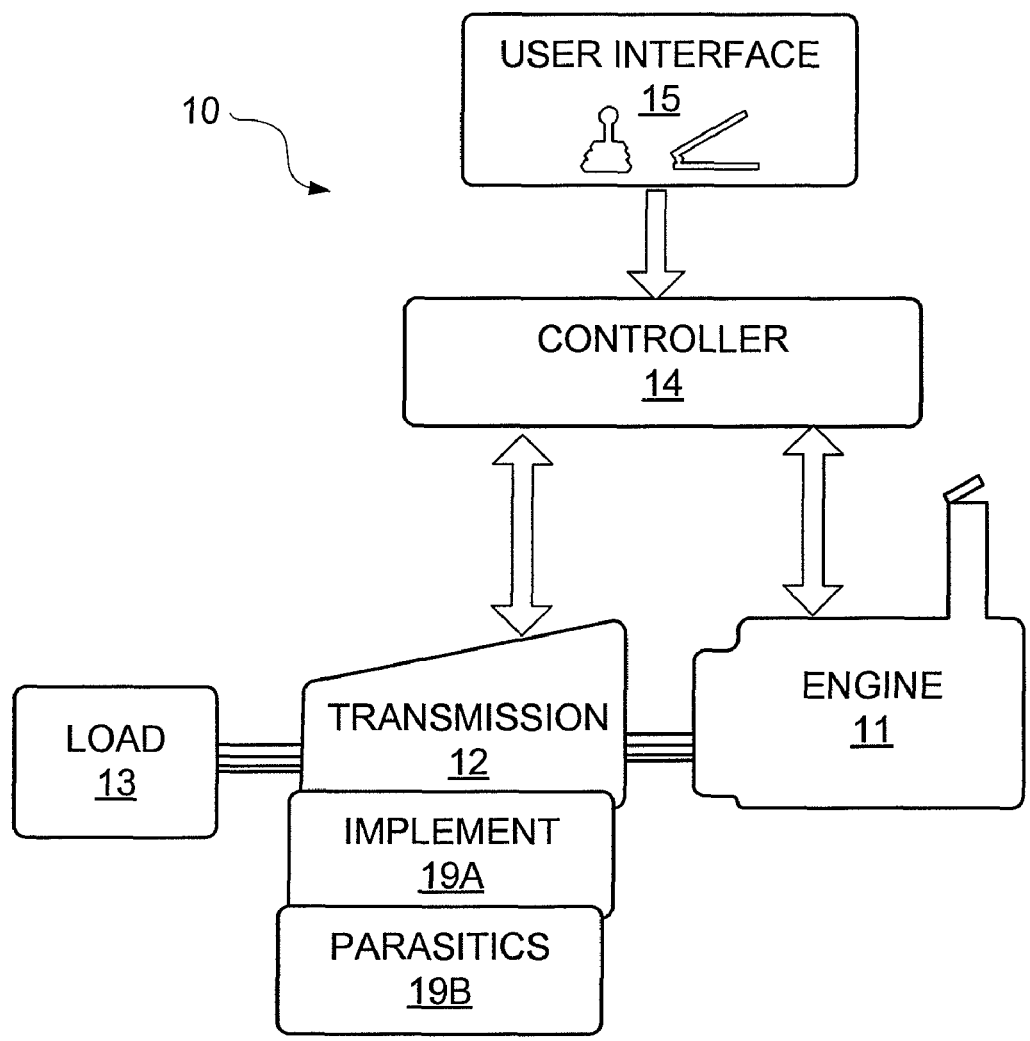
FIG. 1 is a system schematic diagram for a drivetrain system wherein an engine underspeed algorithm may be employed in accordance with the disclosed principles.

Referring to the figures, the interactions of the drivetrain system inputs and elements are shown schematically in FIG. 1. The system 10 includes the engine 11, the transmission 12, and a load 13. The load may be the inertia or weight of the engine 11 or the associated machine itself, or some other load. The system 10 further includes a controller 14 and a user interface 15. The user interface may include typical user interface elements found in conventional machines such as joystick movement command devices and pedal or lever actuators for controlling throttle and/or speed and/or torque.

The controller 14 receives input from the user interface 15 with respect to, for example, desired machine speed and/or power. The controller 14 also receives inputs from the engine 11 and transmission 12 indicating the operating status of these elements, e.g., engine speed/torque and transmission speed/torque. The controller 14 can also receive inputs from other systems like implements and other parasitic loads. Based on these various inputs, the controller 14 controls the operation of the engine 11 and transmission 12, implements 19a and other parasitic devices 19b in a manner calculated to implement commands received from the user interface 15, consistent with system limitations, e.g., anti-lugging, anti-overspeed, etc.

Figure 2:
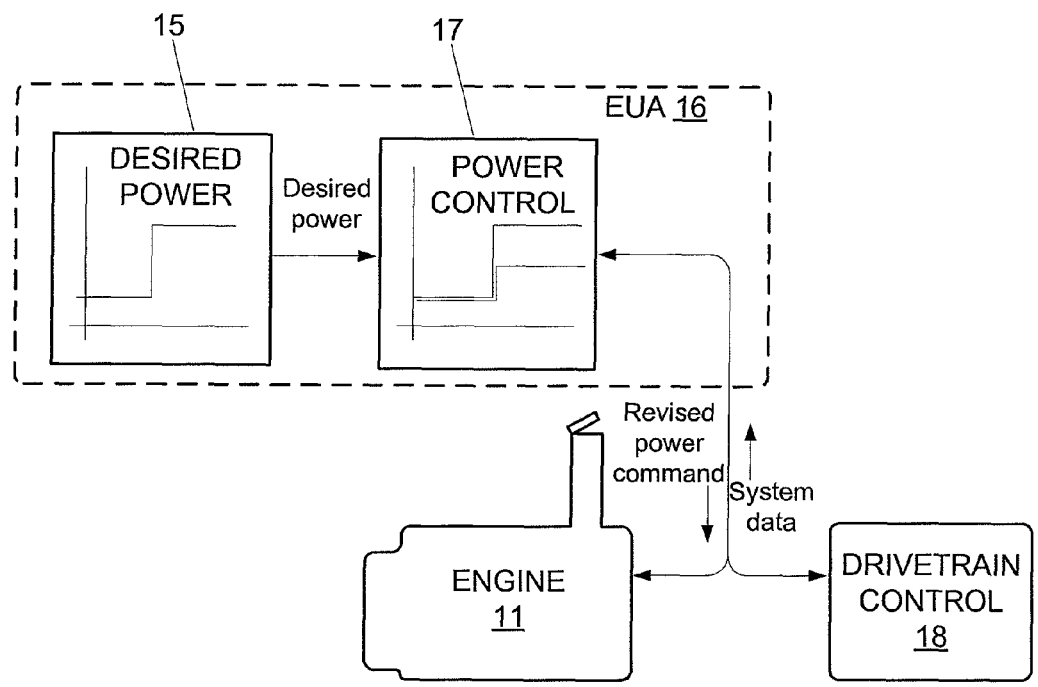
FIG. 2 is system data flow schematic for a drivetrain system in accordance with the disclosed principles.

The data flow among system elements is illustrated in the schematic overview of FIG. 2. The user interface 15 transmits a desired power signal 15 to the engine 11, but the desired power signal 15 is intercepted and further processed. (The desired power signal 15 indicates or can be processed to indicate a desired power).

Within the EAU 16, which may reside in or be a part of the controller 14, a power limiting algorithm 17 receives the desired power signal 15. The power shaping algorithm 17 modifies the desired power signal 15 to create a revised power command. The EUA 16 then provides the revised power command to the drivetrain control 18, as well as the engine 11 as appropriate. It will be appreciated that either the engine 11 or the drivetrain control 18 or both may affect the power used by the machine.

Figure 3:
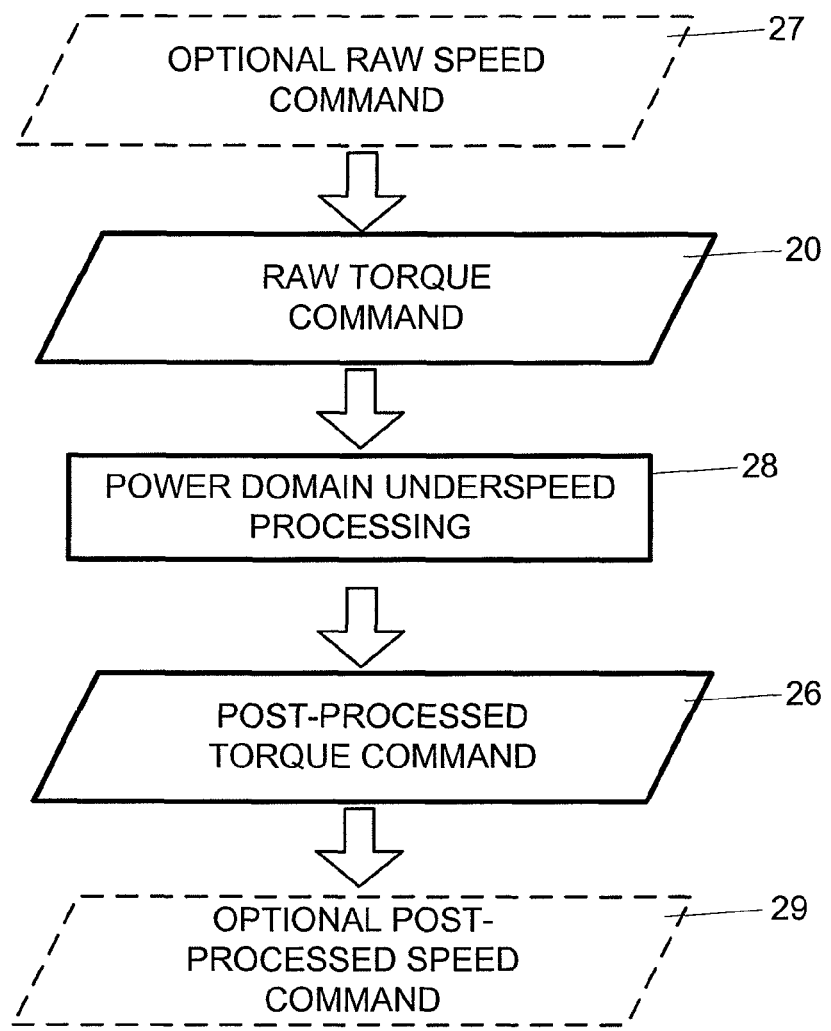
FIG. 3 is a data flow diagram showing in overview the processing flow of user commands and automatically generated commands in accordance with the disclosed principles.
Figure 4:
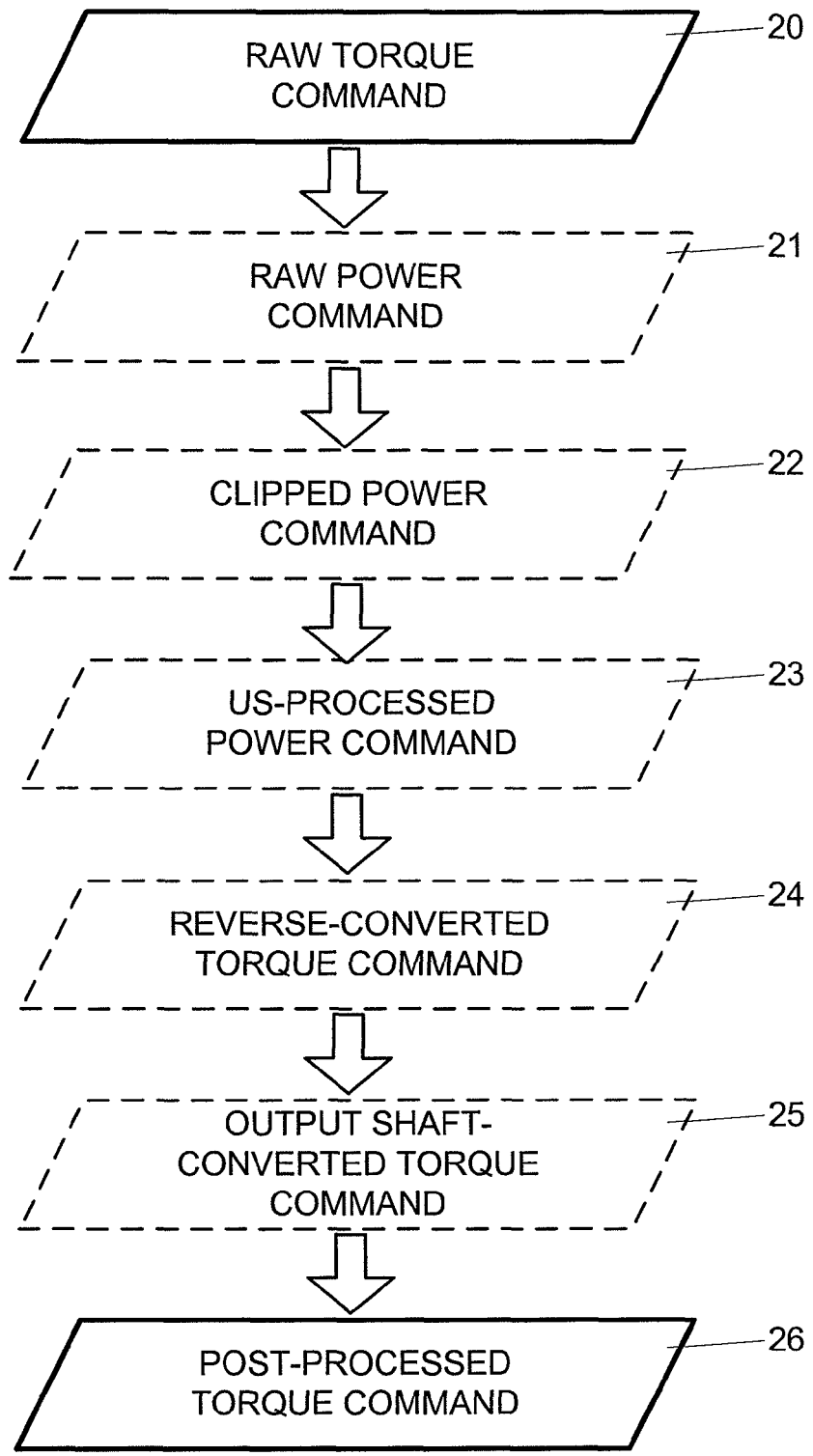
FIG. 4 is a data flow diagram showing steps for performing underspeed processing in a power domain in accordance with the disclosed principles.

FIG. 3 is a data flow diagram showing the processing flow of user commands and automatically generated commands in an embodiment at an abstracted level. The illustrations of FIGS. 3 and 4 are given within the context of the elements and system components described in FIG. 1 and FIG. 2. As can be seen, the conversion and control process operates on a raw torque command 20 provided by the user interface 15, or optionally derived from a precursor value such as a raw speed command 27. The raw torque command 20 is processed into a power domain value that is reduced or otherwise modified for purposes of underspeed control at underspeed stage 28. Having executed the underspeed control in the power domain, the modified power domain value is reconverted to the torque domain and is output as a post-processed torque command 26. The post-processed torque command 26, or optionally a further post-processed speed command 29, is provided to the drivetrain control 19 (and/or to an implement control and/or parasitic load control).

FIG. 4 is a data flow diagram showing in greater detail the power domain underspeed control process of FIG. 3 (stage 28). The raw torque command 20 is processed into a raw power command 21, which is clipped to limit requested power, providing a clipped power command 22 to the EUA 16. It will be appreciated that the various power commands may relate to machine locomotion power, implement power, and/or parasitic load power. The clipping process used in an embodiment to generate the clipped power command 22 will be discussed separately below with respect to another figure.

Referring still to the data flow diagram of FIG. 4, the clipped power command 22 is reduced for purposes of underspeed control to produce an underspeed processed power command 23. This aspect of the system operation will be discussed in further detail with reference to FIG. 7 at a later point herein.

Having executed the underspeed control in the power domain, the processed power command 23 is reconverted to the torque domain as represented by the reverse-converted torque command 24. The reverse-converted torque command 24 is scaled based on machine drivetrain factors to yield an output shaft-converted torque command 25.

Finally, the output shaft-converted torque command 25 is optionally processed, e.g., to mitigate extreme engine lugging when the transmission is unable to follow the torque/speed command, to yield the post-processed torque command 26. This post-processing may involve issuing a command that is not realistically attainable by the system, but which allows the transmission to unload as much as possible, e.g., when a grader blade hits a rock or pile. As noted above, the post-processed torque command 26 is provided to the drivetrain control 19 (and/or to an implement control and/or parasitic load control) to implement the raw torque command 20 in a controlled manner.

Figure 5:
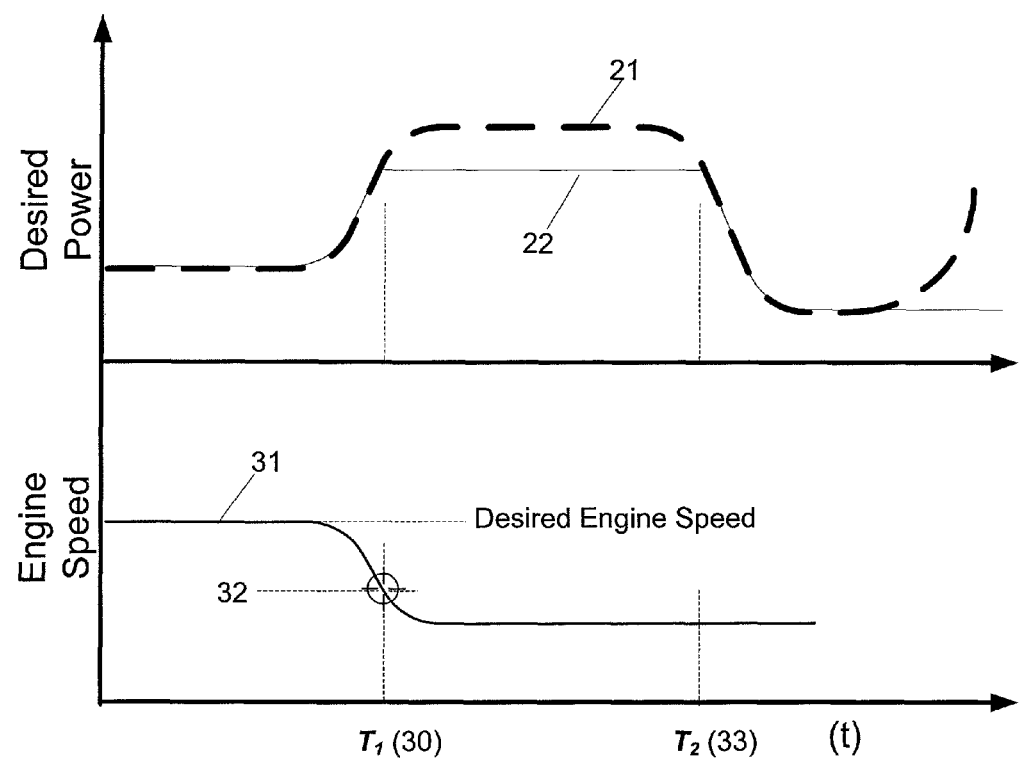
FIG. 5 is a graphical illustration of clipping logic for creating a clipped power command in accordance with the disclosed principles.

The clipping logic for creating the clipped power command 22 is shown graphically in FIG. 5. In particular, the raw power command 21 is clipped when an engine underspeed condition commences at time $T_1$ (30). As can be seen, the engine speed 31 decreases pursuant to increased loading until it crosses a threshold 32, at which point an underspeed condition is diagnosed. Up to this point $T_1$ (30), increases in the raw power command 21 are followed in the clipped power command 22. However, after the engine underspeed condition is diagnosed at point $T_1$ (30), further increases in the raw power command 21 are not followed in the clipped power command 22. In an embodiment, the clipping illustrated in FIG. 5 is only executed when the engine is experiencing an underspeed or lugging condition.

Once the raw power command 21 drops back below the level at which it clipped, the clipped power command 22 again follows the raw power command 21. Thus, in the illustrated example, when the raw power command 21 drops at point $T_2$ (33) back below the level at which it clipped, the clipped power command 22 again begins to follow the raw power command 21. If after time $T_2$ (33), the raw power command 21 increases, a new level for the clipped power command 22 is calculated. The new value may be different than the initial clipped power command 22 value.

Figure 6:
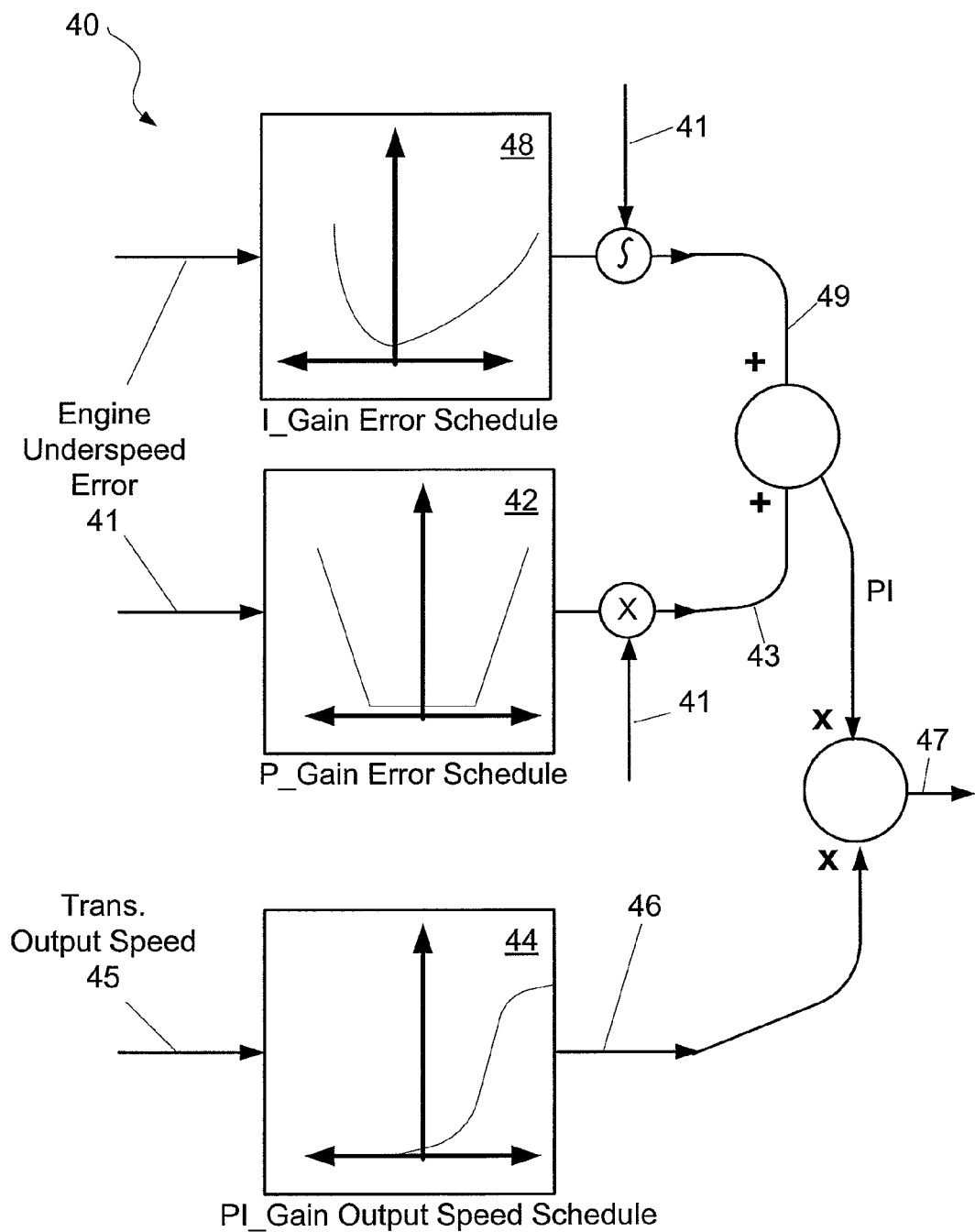
FIG. 6 is a data flow diagram illustrating PI gain scheduling in accordance with the disclosed principles.

Referring again momentarily to FIG. 3, it will be recalled that the clipped power command 22 is modified for purposes of underspeed control to produce an underspeed processed power command 23. In an embodiment, this modification is performed in keeping with certain PI/PID processes. Referring now to FIG. 6, a data flow 40 for PI gain scheduling is shown. This technique is usable in conjunction with the logical flow of FIG. 3 to create the underspeed processed power command 23.

The data flow has, as one input, an engine underspeed error 41. There are a number of ways to characterize and identify engine underspeed, but in an example the engine speed is compared to a static or dynamic threshold and the difference value is used to indicate the degree of engine underspeed, with a difference of greater than a threshold amount leading to a diagnosis of engine underspeed. A P_Gain Error Schedule 42 receives the engine underspeed error 41 and provides a P_Gain signal, that is proportional to the engine underspeed error 41, that is multiplied by the engine underspeed error 41 to produce a P output 43. The P_Gain Error Schedule 42 is shaped in the illustrated example such that increased error (e.g., increased distance from vertical axis) leads to an increased degree of correction.

An I_Gain Error Schedule 48 receives the engine underspeed error 41 and provides an I_Gain signal that is related to the integral of the engine underspeed error 41. The product of the I_Gain signal and the engine underspeed error 41 is integrated to produce an I output 49. The I output 49 and the P output 43 are summed to produce a PI value.

At the same time, a PI_Gain Output Speed Schedule 44 receives the transmission output speed signal 45 as an input. The PI_Gain Output Speed Schedule 44 provides a shaped output 46 that is multiplied with the PI value to create a reduction signal 47. The PI_Gain Output Speed Schedule is shaped in the illustrated embodiment so as to reduce the overall system gain at low output speeds since small power changes at low output speeds yield large torque changes.

Figure 7:
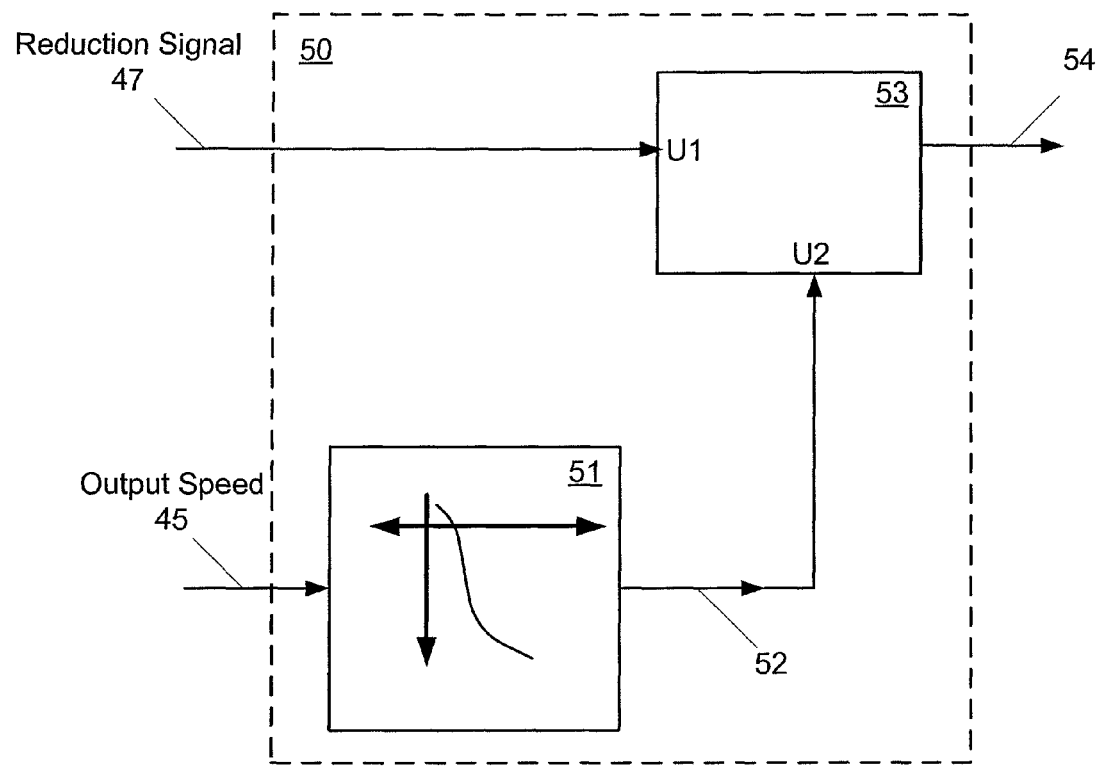
FIG. 7 is a logical schematic of an implementation of an exemplary underspeed module in accordance with the disclosed principles.

In an embodiment, the reduction signal 47 is further processed via an underspeed algorithm for accommodating a maximum underspeed power difference and integral resets before being used to create the underspeed processed power command 23. FIG. 7 shows an implementation, in logical schematic form, of an exemplary underspeed module 50. The underspeed module 50 operates on the principle that asking for zero power at zero speed could result in the machine actually rolling backward on a grade if the implements cause the engine speed to experience a transient droop. At the same time, the underspeed module 50 allows for retarding commands at high ground speed (when no risk of rolling backward) to account for extreme loading conditions of the engine 11 when the transmission 12 does not faithfully follow the commanded power. Thus the high retarding command forces the transmission 12 to saturate its ability to reduce load to the engine 11. The maximum retarding level may be determined empirically based on the ability of the transmission 12 to follow the commanded power. For example, transmissions that follow the command closely (e.g., electric drives) would have this value set to a near zero power limit.

Thus, the underspeed module 50 converts the transmission output speed signal 45 via a gain curve 51 to produce a maximum underspeed power limit 52. A limiter 53 compares the maximum underspeed power limit 52 with the reduction signal 47, and provides a post-limited underspeed command 54. The post-limited underspeed command 54 is subtracted from the clipped power command 22 to produce the underspeed-processed power command 23. Those of skill in the art will appreciate that the power reduction with respect to the clipped power command 22 may be executed via a fractional multiplier rather than a subtractive step if desired.

Figure 8:
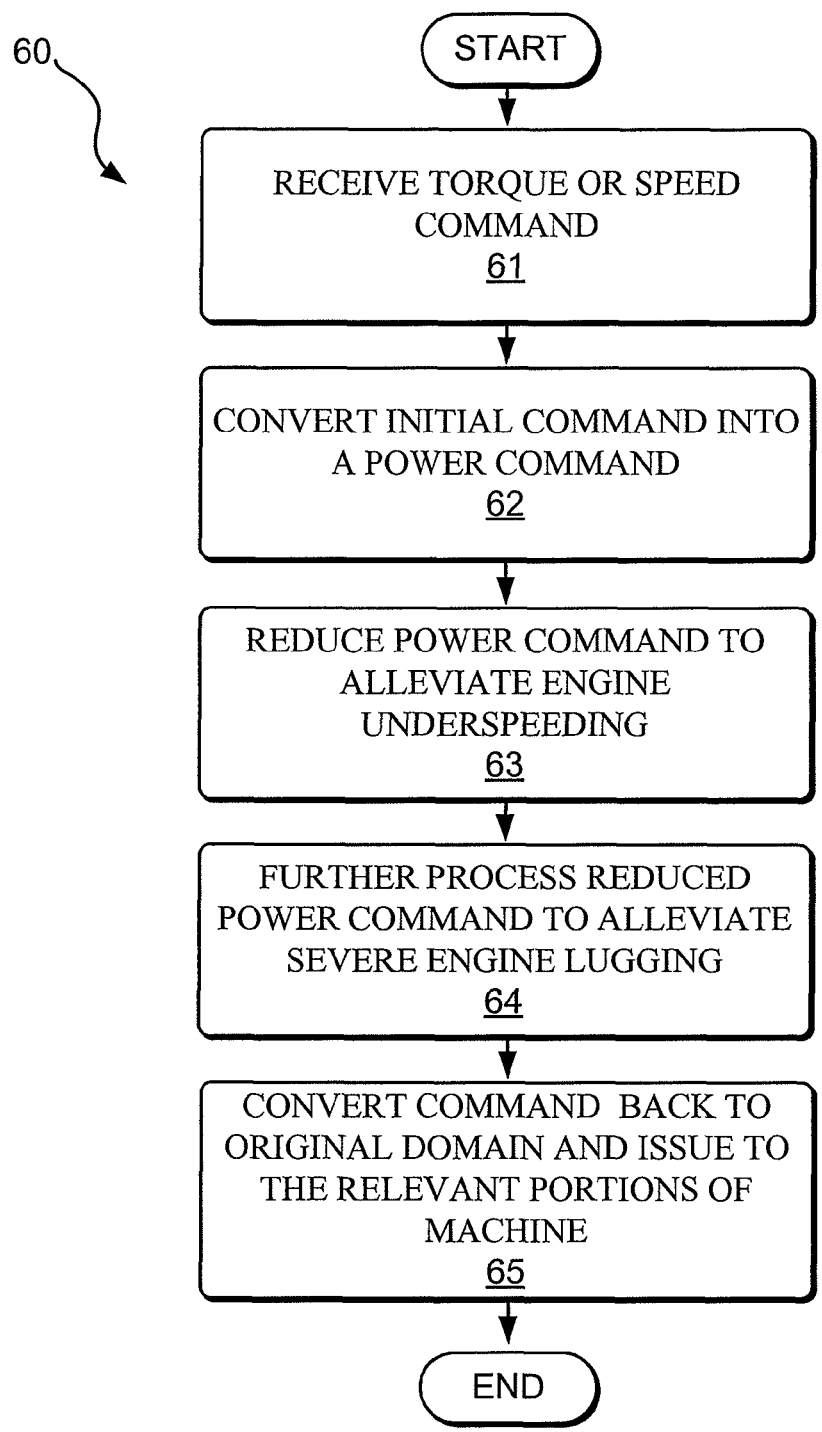
FIG. 8 is a flow chart illustrating a process for power-based underspeed correction in accordance with the disclosed principles.

FIG. 8 is a flow chart illustrating a process 60 for power-based underspeed correction. At stage 61 of the process 60, a torque or speed command is received. The initial command is converted at stage 62 into a power command. At stage 63, the power command is reduced to alleviate engine underspeeding. The reduced power command may be further processed in stage 64 to ensure that severe engine lugging is alleviated to the extent possible. At stage 65, the reduced and post-processed command is converted back to its original domain (e.g., speed or torque) and issued to the relevant portion(s) of the machine.

INDUSTRIAL APPLICABILITY

The present disclosure is applicable to machines having CVT-driven transmissions or other direct-drive transmissions where engine lugging is possible. In these types of transmissions, there are generally controls in place to ensure that the engine does not lug down under load. These controls generally analyze requested throttle increases to determine whether the engine fails to follow the requested increase. If the engine fails to follow the requested increase, an engine underspeed algorithm may decrease the overall requested system power, helping engine speed response. The disclosed principles allow the system to perform more efficient underspeed processing by operating on power-based parameters rather than speed-based parameters alone or torque-based parameters alone.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of adjusting the operation of an engine-driven machine to avoid engine under-speeding, the method comprising:
    receiving an initial command specifying a value related to a desired torque;
    converting the received command into a power command;
    sensing an engine under-speed condition;
    reducing the power command to an underspeed processed power command;
    converting the underspeed processed power command to units that are the same as the units of the initial command; and
    issuing the converted underspeed processed power command to a portion of the machine to alleviate the engine under-speeding condition.

2. The method according to claim 1, wherein the value related to the desired torque is a torque value.

3. The method according to claim 1, wherein the value related to the desired torque is a speed value.

4. The method according to claim 1, wherein sensing an engine under-speed condition comprises detecting that a speed of the engine has dropped below a predetermined threshold value.

5. The method according to claim 1, further comprising reducing the underspeed processed power command to alleviate severe engine lugging.

6. The method according to claim 1, wherein issuing the converted underspeed processed power command to a portion of the machine comprises issuing the converted underspeed processed power command to a transmission of the machine.

7. The method according to claim 1, wherein reducing the power command to an underspeed processed power command comprises clipping the power command at the level at which it resided when the under-speed condition was detected, such that power command is clipped if rises above the level at which it resided when the under-speed condition was detected and is otherwise not clipped.

8. The method according to claim 7, wherein reducing the power command to an underspeed processed power command further comprises, when the under-speed condition is detected, applying an I_Gain error schedule, a P_Gain error schedule, and a PI_Gain output speed schedule.

9. A controller for adjusting the operation of an engine-driven machine to avoid engine under-speeding, the controller comprising:
    a computer readable medium including computer-readable instructions, the computer-readable instructions including:
        instructions for receiving an initial command specifying a value related to a desired torque;
        instructions for converting the received command into a power command;
        instructions for sensing an engine under-speed condition;
        instructions for reducing the power command to an underspeed processed power command;
        instructions for converting the underspeed processed power command to units that are the same as the units of the initial command; and
        instructions for issuing the converted underspeed processed power command to a portion of the machine to alleviate the engine under-speeding condition.

10. The controller according to claim 9, wherein the value related to the desired torque is a torque value.

11. The controller according to claim 9, wherein the value related to the desired torque is a speed value.

12. The controller according to claim 9, wherein the instructions for sensing an engine under-speed condition comprise instructions for detecting that a speed of the engine has dropped below a predetermined threshold value.

13. The controller according to claim 9, further comprising instructions for reducing the underspeed processed power command to alleviate severe engine lugging.

14. The controller according to claim 9, wherein the instructions for issuing the converted underspeed processed power command to a portion of the machine comprise instructions for issuing the converted underspeed processed power command to a transmission of the machine.

15. The controller according to claim 9, wherein the instructions for reducing the power command to an underspeed processed power command comprise instructions for clipping the power command at the level at which it resided when the under-speed condition was detected, such that power command is clipped if rises above the level at which it resided when the under-speed condition was detected and is otherwise not clipped.

16. The controller according to claim 15, wherein the instructions for reducing the power command to an underspeed processed power command further comprise instructions for applying an I_Gain error schedule, a P_Gain error schedule, and a PI_Gain output speed schedule when the under-speed condition is detected.

17. An engine-driven machine having a power-domain underspeed function, the machine comprising:
   an engine;
   a transmission linked to the engine; and
   a controller for receiving data from the engine and for sending commands to the transmission, the controller being adapted to detect an engine underspeed condition and to convert a received command in a first domain into a power command and to perform underspeed processing on the power command to produce a reduced power command, convert the reduced power command into a final command in the first domain.

18. The engine-driven machine according to claim 17, wherein the first domain is one of a speed domain and a torque domain.

19. The engine-driven machine according to claim 17, wherein controller is further adapted to provide the final command to the transmission.

20. The engine-driven machine according to claim 17, wherein performing underspeed processing on the power command comprises applying an I_Gain error schedule, a P_Gain error schedule, and a PI_Gain output speed schedule.

* * * * *